(12) United States Patent
Chen

(10) Patent No.: US 10,097,817 B2
(45) Date of Patent: Oct. 9, 2018

(54) DOUBLE-IMAGE PROJECTION DEVICE PROJECTING DOUBLE IMAGES ONTO 3-DIMENSIONAL EAR CANAL MODEL

(71) Applicant: Megaforce Company Limited, New Taipei (TW)

(72) Inventor: Wei-Hsuan Chen, New Taipei (TW)

(73) Assignee: MEGAFORCE COMPANY LIMITED, New Taipei (TW)

( * ) Notice: Subject to any disclaimer, the term of this patent is extended or adjusted under 35 U.S.C. 154(b) by 85 days.

(21) Appl. No.: 15/227,883

(22) Filed: Aug. 3, 2016

(65) Prior Publication Data

US 2018/0041752 A1 Feb. 8, 2018

(51) Int. Cl.
H04N 13/04 (2006.01)
H04N 9/31 (2006.01)
H04N 13/388 (2018.01)

(52) U.S. Cl.
CPC ......... *H04N 13/388* (2018.05); *H04N 9/3129* (2013.01); *H04N 9/3161* (2013.01); *H05K 999/99* (2013.01)

(58) Field of Classification Search
CPC . H04N 13/0488; H04N 9/3129; H04N 9/3161
USPC .......................................................... 348/77
See application file for complete search history.

(56) References Cited

U.S. PATENT DOCUMENTS

| | | | | |
|---|---|---|---|---|
| 4,209,919 A * | 7/1980 | Kirikae | ................. | G09B 23/30 434/270 |
| 4,944,681 A * | 7/1990 | Burgio | ................. | G09B 23/28 434/267 |
| 5,505,623 A * | 4/1996 | Chernack | ............... | G09B 23/30 434/270 |
| 5,997,307 A * | 12/1999 | LeJeune, Jr. | ........... | G09B 23/30 434/262 |
| 7,850,455 B2 * | 12/2010 | Cottler | ................... | G09B 23/34 434/262 |
| 2006/0183096 A1 * | 8/2006 | Riener | .................... | G09B 23/30 434/276 |
| 2008/0050710 A1 * | 2/2008 | Cottler | ................... | G09B 23/28 434/270 |
| 2009/0018465 A1 * | 1/2009 | Hessel | ................. | A61B 5/0062 600/559 |
| 2012/0088215 A1 * | 4/2012 | Bellezzo | ................ | G09B 23/36 434/270 |
| 2012/0281071 A1 * | 11/2012 | Bergman | ............... | G01B 11/25 348/46 |

(Continued)

*Primary Examiner* — Francis Geroleo
(74) *Attorney, Agent, or Firm* — Chun-Ming Shih

(57) ABSTRACT

A double-image projection device includes a laser projector, a semi-reflection mirror, and an ear canal model. The semi-reflection mirror is located in front of the laser projector; while the laser projector includes a MEMS (micro-electro-mechanical system) scanner for projecting scanning light beams, such that the scanning light beams is projected onto an imaging plane as a large image through transmitting through the semi-reflection mirror. The ear canal model is located in a reflective light path of the semi-reflection mirror, with its front end provided with a viewing port, and with its rear end provided with an ear drum piece, such that the scanning light beams emitted by the laser projector is projected onto the ear drum piece of the ear canal model a small image, through reflecting by the semi-reflection mirror.

2 Claims, 1 Drawing Sheet

(56) References Cited

U.S. PATENT DOCUMENTS

2015/0035943 A1* 2/2015 Hatzilias ............ A61B 1/227
348/46
2016/0051134 A1* 2/2016 Hatzilias ............ A61B 1/227
348/65

* cited by examiner

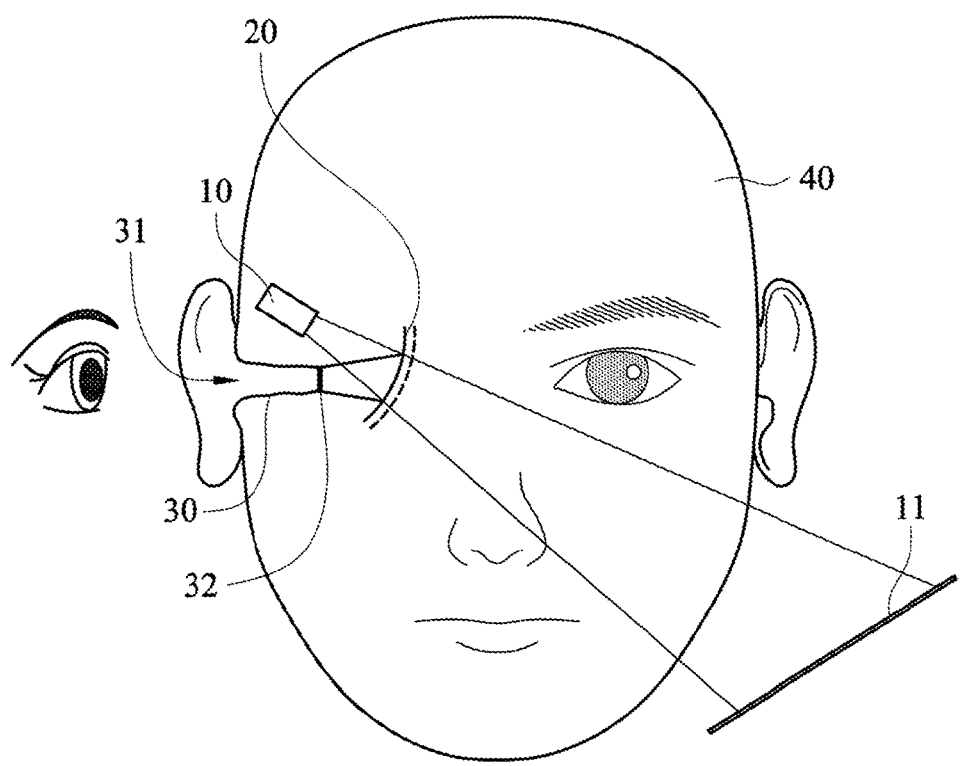

DOUBLE-IMAGE PROJECTION DEVICE PROJECTING DOUBLE IMAGES ONTO 3-DIMENSIONAL EAR CANAL MODEL

BACKGROUND OF THE INVENTION

Field of the Invention

The present invention relates to an image projection device, and in particular to a double-image projection device, capable of projecting double-images onto 3-dimensional ear canal model, such that a viewer may observe and learn various symptoms of an ear through looking at the images.

The Prior Arts

Projectors have been used widely for many years, to display static or dynamic images, or the contents stored in a computer. For example, in a meeting held in a big conference room, a projector can be used to project the contents stored in a notebook computer on a display screen, for viewing by a lot of attendees. Or, in a class room, a projector can be used to project teaching video stored in a notebook computer on a display screen, to help proceed with teaching.

In real life, both the internal ear canal and the external ear canal are of a 3-Dimentional shape rather than a planar shape. Therefore, for the type of planar image teaching tool, it is rather difficult to observe the actual symptoms of the ears, as such adversely affecting the efficiency and effectiveness of teaching.

Therefore, presently, the design of the image projection device is not quite satisfactory, and it leaves much room for improvement.

SUMMARY OF THE INVENTION

According to an embodiment of the present invention, the present invention provides a double-image projection device, comprising: a laser projector, a semi-reflection mirror, and an ear canal model. The laser projector is disposed in a head model, and it includes an MEMS (micro-electromechanical system) scanner, for projecting scanning light beams containing images about various symptoms of an ear. The semi-reflection mirror is disposed in a head model, and is located in front of the laser projector, such that the scanning light beams emitted by the laser projector is projected onto an imaging plane as a large image by transmitting through the semi-reflection mirror. The ear canal model is disposed in a head model, and is located in a reflective light path of the semi-reflection mirror, with its front end provided with a viewing port, and with its rear end provided with an ear drum piece, such that the scanning light beams emitted by the laser projector is projected onto the ear drum piece of the ear canal model as a small image through reflecting by the semi-reflection mirror. As such, by looking through the viewing port, a viewer may observe the 3-dimensional details and contours of the images related to various ear symptoms, as projected onto the ear drum piece. Meanwhile, the viewer may adjust the scanning light beams of the laser projector through observing the large image projected onto the imaging plane.

Therefore, through looking at images projected onto the ear canal model, a viewer may observe and learn easily the 3-dimensional details and contours for various symptoms of the ear, thus raising teaching and learning efficiency and effectiveness significantly.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which:

FIG. 1 is a schematic diagram of a double-image projection device according to an embodiment of the present invention.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Refer to FIG. 1 for a schematic diagram of a double-image projection device according to an embodiment of the present invention. As shown in FIG. 1, the double-image projection device includes: a laser projector 10, a semi-reflection mirror 20, and an ear canal model 30.

The laser projector 10 is disposed in a head model 40, and it includes an MEMS (micro-electromechanical system) scanner, for projecting scanning light beams containing images about various symptoms of an ear.

The semi-reflection mirror 20 is disposed in a head model 40, and is located in front of the laser projector 10, such that the scanning light beams emitted by the laser projector 10 is projected onto an imaging plane 11 as a large image by transmitting through the semi-reflection mirror 20.

The ear canal model 30 is disposed in a head model 40, and is located in a reflective light path of the semi-reflection mirror 20, with its front end provided with a viewing port 31, and with its rear end provided with an ear drum piece 32, such that the scanning light beams emitted by the laser projector 10 is projected onto the ear drum piece 32 of the ear canal model 30 as a small image through reflecting by the semi-reflection mirror 20.

Refer again to FIG. 1, in application, by looking through the viewing port 31, a viewer may observe the 3-dimensional details and contours of the images related to various ear symptoms, as projected onto the ear drum piece 32. Meanwhile, the viewer may adjust the scanning light beams of the laser projector 10 through observing the large image projected onto the imaging plane 11.

Therefore, through looking at images projected onto the ear canal model, a viewer may observe and learn easily the 3-dimensional details and contours for various symptoms of the ear, thus raising teaching and learning efficiency and effectiveness significantly.

Moreover, in an embodiment of the present invention, the semi-reflection mirror 20 has reflectivity of 30% to 70%.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A double-image projection device, comprising:
   a laser projector, disposed in a head model, and including a MEMS (micro-electromechanical system) scanner, for projecting scanning light beams containing images about various symptoms of an ear;
   a semi-reflection mirror, disposed in a head model, and located in front of the laser projector, such that the scanning light beams emitted by the laser projector, is projected onto an imaging plane as a first image, by transmitting through the semi-reflection mirror; and
   an ear canal model, disposed in the head model, and located in a reflective light path of the semi-reflection mirror, with its front end provided with a viewing port, and with its rear end provided with an ear drum piece, such that the scanning light beams emitted by the laser projector is projected onto the ear drum piece of the ear canal model a second image, through reflecting by the semi-reflection mirror, as such a viewer observes through the viewing port 3-dimensional details and contours of the images related to the various ear symptoms as projected onto the ear drum piece.

2. The double-image projection device as claimed in claim 1, wherein the semi-reflection mirror has reflectivity of 30% to 70%.

* * * * *